US012253259B2

(12) United States Patent
Kraemer et al.

(10) Patent No.: US 12,253,259 B2
(45) Date of Patent: Mar. 18, 2025

(54) COMBUSTION SYSTEMS INCLUDING HEAT MODULES, AND ASSOCIATED DEVICES AND METHODS

(71) Applicant: Modern Electron, Inc., Bothell, WA (US)

(72) Inventors: Daniel Kraemer, Mukilteo, WA (US); Yan Chen, Woodinville, WA (US); Patrick D. Noble, Seattle, WA (US); Vikas Patnaik, Mukilteo, WA (US)

(73) Assignee: Modern Hydrogen, Inc., Bothell, WA (US)

( * ) Notice: Subject to any disclaimer, the term of this patent is extended or adjusted under 35 U.S.C. 154(b) by 425 days.

(21) Appl. No.: 17/870,656

(22) Filed: Jul. 21, 2022

(65) Prior Publication Data

US 2023/0025491 A1     Jan. 26, 2023

Related U.S. Application Data

(60) Provisional application No. 63/224,060, filed on Jul. 21, 2021.

(51) Int. Cl.
    *F23C 7/06*        (2006.01)
    *F23C 6/04*        (2006.01)
    *F23N 1/00*        (2006.01)

(52) U.S. Cl.
    CPC .............. *F23C 7/06* (2013.01); *F23C 6/047* (2013.01); *F23N 1/002* (2013.01); *F23N 2900/05001* (2013.01)

(58) Field of Classification Search
    CPC .. F23C 7/06; F23C 6/047; F23N 1/002; F23N 2900/05001

(Continued)

(56) References Cited

U.S. PATENT DOCUMENTS 3,312,840 A    4/1967   Gaber
5,938,427 A *   8/1999   Suzuki .................. F23D 11/448
                                                             431/170

(Continued)

FOREIGN PATENT DOCUMENTS

EP            0317110         5/1989
WO     WO-2009014980    1/2009

OTHER PUBLICATIONS

International Search Report and Written Opinion for International Patent Applicatio No. PCT/US22/37925, Applicant: Modern Electron, Inc., mailed Nov. 24, 2022, 13 pages.

*Primary Examiner* — Vivek K Shirsat
(74) *Attorney, Agent, or Firm* — Fredrikson & Byron, P.A.

(57) ABSTRACT

Combustion systems and associated methods are disclosed herein. In some embodiments, a combustion system comprises a first combustion zone, a second combustion zone downstream of the first combustion zone, and a heat module thermally coupled to the first combustion zone and/or second combustion zone. The first combustion zone is configured to (i) receive and combust preheated air and a first fuel and (ii) generate a first exhaust gas, and the second combustion zone is configured to (i) receive and combust the first exhaust gas and a second fuel and (ii) generate a second exhaust gas. The first exhaust gas can have a first excess air and the second exhaust gas can have a second excess air less than the first excess air. The heat module can comprise a thermionic converter or another heat-to-electricity converter able to generate a power output.

25 Claims, 14 Drawing Sheets

(58) Field of Classification Search
USPC .......................................................... 431/11
See application file for complete search history.

(56) References Cited

U.S. PATENT DOCUMENTS

| | | | |
|---|---|---|---|
| 6,412,282 B1 * | 7/2002 | Willis | F23R 3/346 60/737 |
| 2010/0244336 A1 * | 9/2010 | Cain | F27D 17/008 266/44 |

* cited by examiner

COMBUSTION SYSTEMS INCLUDING HEAT MODULES, AND ASSOCIATED DEVICES AND METHODS

CROSS-REFERENCE TO RELATED APPLICATIONS

The present application claims the benefit of U.S. Provisional Patent Application No. 63/224,060, filed Jul. 21, 2021, the disclosure of which is incorporated herein by reference in its entirety.

TECHNICAL FIELD

This present disclosure relates to combustion systems including heat modules, and associated devices and methods. In particular embodiments, the combustion systems enable combustion of preheated air with fuel at various combustion zones along a dimension of the combustion system.

BACKGROUND

To improve efficiency of a combustion system, air is often preheated to increase the availability of heat for combustion. However, doing so can lead to increased combustion temperatures, which in turn leads to increased nitric oxide (NO) and nitrogen dioxide ($NO_2$) emissions (collectively referred to as $NO_x$ emissions). $NO_x$ emissions, which can be highly regulated in industry, commercial, and residential applications, are a function of the combustion gas temperature, the residence time of the combustion gas at temperatures promoting thermal $NO_x$ formation (e.g., temperatures above about 1600° C.), and species concentration, amongst other factors. As such, common approaches to minimize $NO_x$ emissions can include (1) quenching the combustion gas to minimize residence time at high temperatures, e.g., by dilution with additional air or by convection heat transfer via a heat exchanger, (2) adding excess air to the combustion process, and (3) recirculating cooled exhaust gas (EGR) to decrease peak adiabatic flame temperatures. However, each of these approaches also increases pressures drop through the system, which can significantly affect process operations and/or economic viability of the underlying process. For example, for applications in the combined heat and power (CHP) industries (e.g., home heating appliances), pressure often must be maintained above a lower limit threshold, and the concentration of heat must be high enough, to enable electricity production. Moreover, for home heating appliances, the ability to limit $NO_x$ emissions can be even more difficult because space heating needs cannot be sacrificed for the sake of electrical power generation, and high heat fluxes are required for heat engine operation.

In view of this, there is a desire for combustion systems with improved efficiency and/or ability to limit $NO_x$ emissions while providing other desired functionality.

BRIEF DESCRIPTION OF THE DRAWINGS

Features, aspects, and advantages of the presently disclosed technology may be better understood with regard to the following drawings.

Figure 1A:
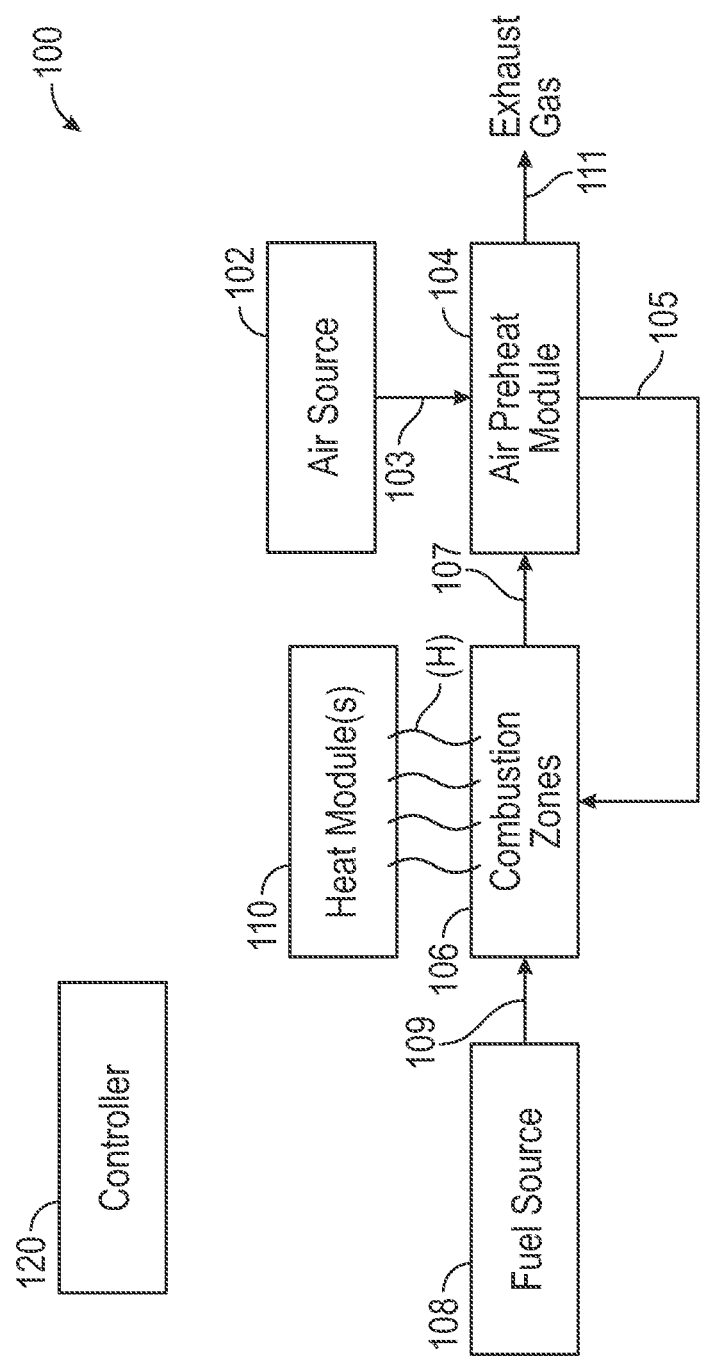
FIGS. 1A-4 are schematic block diagrams of combustion systems including heat modules, in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present technology relate to combustion systems configured to combust preheated air with fuel at various combustion zones spaced apart from one another along a length of the combustion system. The combustion system generates heat of combustion absorbed via heat modules thermally coupled to the combustion zones. As referenced previously, improving the efficiency of a combustion system (e.g., by increasing combustion temperatures) is often at odds with other factors, such as undesirable $NO_x$ emissions. That is, as combustion temperatures increase, so does $NO_x$ emissions. Additionally, other means for decreasing $NO_x$ emissions, such as quenching the combustion gas or recirculating cooled exhaust gas, can have other undesirable effects, including causing pressure drop throughout the system that disrupts the underlying process and/or affects economic viability.

Embodiments of the present technology address at least some of the above described issues for combustion systems by distributing fuel throughout the combustion system in a manner that enables (i) combustion to occur at combustion zones that are spaced apart from one another and (ii) heat to be absorbed via heat modules from each of the combustion zones (e.g., prior to further combusting exhaust gases in subsequent combustion zones). For example, embodiments of the present technology can include a combustion device or system comprising a first combustion zone, a second combustion zone downstream of the first combustion zone, and a heat module thermally coupled to the first combustion zone and/or the second combustion zone. The first combustion zone is configured to (i) receive and combust preheated air and a first amount of fuel and (ii) generate a first exhaust gas that has a first concentration of excess air. The second combustion zone is configured to (i) receive and combust the first exhaust gas and a second fuel and (ii) generate a second exhaust gas having a second concentration of excess air less than the first concentration of excess air. In such embodiments, the first combustion zone and the second combustion zone are positioned relative to one another in series, such that exhaust gas, produced via combustion in the first combustion zone, is used for combustion with the second fuel in the second combustion zone. Downstream combustion zones can be configured in a similar manner, e.g., with a third combustion zone configured to (i) receive and combust the second exhaust gas from the second combustion zone and fuel and (ii) generate a third exhaust gas having a third concentration of excess air less than the second concentration of excess air. The heat module can absorb heat from the first combustion zone and/or the second combustion zone (and other combustion zones), and utilize the absorbed heat for, e.g., generating electricity, chemical processing, and/or other desirable energy needs.

Embodiments of the present technology can be particularly beneficial for CHP applications (e.g., home or commercial furnace applications), in which high air-preheat temperatures and high heat fluxes (e.g., >10 W/cm$^2$) exist, and $NO_x$ emissions are kept below regulatory thresholds (e.g., 40 ppm). For embodiments of the present technology, in part because the exhaust gas of each combustion zone is directed to subsequent combustion zones, and heat modules that absorb the heat of combustion can be incorporated within or immediately adjacent the combustion zones, combustion generally requires a minimal volume of air/oxidant and residence time for the combustion gas at high temperatures is minimized. As such, these factors help mitigate issues commonly associated with combustion taking up too much space and excessive $NO_x$ emissions. Additional details regarding heat engines and CHP systems, which may be utilized with embodiments of the present technology, are described in additional detail in U.S. patent application Ser. No. 16/794,142, filed Feb. 18, 2020, entitled "COMBINED HEATING AND POWER MODULES AND DEVICES", U.S. patent application Ser. No. 16/814,930, filed Mar. 10, 2020, entitled "COMBINED HEATING AND POWER MODULES AND DEVICES", U.S. patent application Ser. No. 17/155,605, filed Jan. 22, 2021, entitled "COMBINED HEATING AND POWER MODULES AND DEVICES", U.S. patent application Ser. No. 17/155,754, filed Jan. 22, 2021, entitled "COMBINED HEATING AND POWER MODULES AND DEVICES", U.S. patent application Ser. No. 17/200,085, filed Mar. 12, 2021, entitled "COMBINED HEATING AND POWER MODULES AND DEVICES", and U.S. patent application Ser. No. 17/200,154, filed Mar. 12, 2021, entitled "COMBINED HEATING AND POWER MODULES AND DEVICES," the disclosures of which are incorporated herein by reference in their entireties.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Combustion Systems and Associated Methods

FIG. 1A is a schematic block diagram of a combustion system 100 ("system 100"), in accordance with embodiments of the present technology. The system 100 includes an air preheat module 104 configured to receive an oxidant or air 103 ("air 103") from an air or oxidant source 102 ("air source 102") and to generate preheated air 105. The air source 102 can be a fan, blower or other device for delivering forced air at a desired flow rate. The air preheat module 104 can preheat the preheated air 105 to be at least above an auto-ignition temperature when combined with a fuel. For example, the preheated air 105 can be at least 600° C., 700° C., 800° C., 900° C., or 1000° C., or within a range of 600-1000° C. (or any incremental value therebetween).

The system 100 further includes combustion zones or combustion modules 106 ("combustion zones 106") (e.g., at least two combustion zones, four combustion zones, ten combustion zones, fifty combustion zones, one hundred combustion zones, etc.) and one or more heat modules 110 ("heat module(s) 110") thermally coupled to the combustion zones 106, as indicated by heat (H) provided by the combustion zones 106 and absorbed by the heat modules 110. The combustion zones 106 are configured to receive the preheated air 105 from the air preheat module 104 and a fuel 109 (e.g., natural gas, propane, methane, other hydrocarbon, or hydrogen) from a fuel source 108 to generate a heated exhaust gas 107. The fuel source 108 can comprise a compressed fuel source or gas line (e.g., utility-provided gas line), and can provide the fuel 109 to the combustion zones 106 at a pressure higher than the pressure of the preheated air 105 provided to the combustion zones 106, e.g., to ensure the fuel 109 can be injected into the combustion zones 106 and/or mixed with the preheated air 105. In some embodiments, the fuel 109 provided to the combustion zones 106 can be at ambient temperature and/or below 100° C. For embodiments in which the fuel 109 includes hydrocarbons, heating or preheating the fuel 109 is generally discouraged as it can lead to thermal cracking, plugging of inlet nozzles, and other flow issues within the system 100. For embodiments in which the fuel 109 comprises or is hydrogen, the fuel 109 can be heated or preheated, which advantageously can provide additional thermal mass to the combustion zones 106 and generally increase efficiency of the system 100. As explained herein, the fuel 109 can be provided to the individual combustion zones 106 at different flow rates. For example, the fuel 109 can be provided to a first one of the combustion zones 106 at a first flow rate and to a second one of the combustion zones 106, downstream of the first one of the combustion zones, at a second flow rate lower than the first flow rate.

The heated exhaust gas 107 can be at least 1000° C., 1050° C., 1100° C., 1150° C., 1200° C., 1250° C., or 1300° C., or within a range of 1000-1300° C. (or any incremental value therebetween). The heated exhaust gas 107 is directed to the air preheat module 104 and used to preheat the air 103, and afterward becomes a cooled exhaust gas 111. The cooled exhaust gas 111 can be no more than 300° C., 600° C., 900° C., 1000° C., or 1100° C., or within a range of 300-1000° C. In some embodiments, the system 100 can further include an induced draft fan configured to pull the cooled exhaust gas 111 and the heated exhaust gas 107 through the system to draw a vacuum. In such embodiments, pressure within the combustion zones 106 can be negative. In other embodiments, pressure within the combustion zones 106 is positive.

The heat module(s) 110 can include a heat exchanger (e.g., a fin-type heat exchanger, flat plate heat exchanger, etc.), a heat engine, a heat-to-electricity converter, a thermionic energy converters (TEC), an alkali metal thermal to electric converters (AMTEC), a thermophotovoltaic (TPV), a thermoelectric converter (TC), gas turbine, Stirling engine, and/or a fuel cell. Additionally or alternatively, the heat module(s) 110 can utilize the absorbed heat from the combustion to enable chemical processing, including promoting or enabling endothermic reactions, syngas manufacturing, hydrogen production, hydrolysis, boiling, melting, and/or methane cracking. As explained herein, the heat module(s) 110 can be thermally coupled to the combustion zones 106 via convection, conduction, and/or any other heat transfer means, as well as in different mechanical arrangements. For example, the heat module(s) 110 can be integral with (e.g., encapsulated within) the combustion zones 106, or be spaced apart from the combustion zones 106. Additionally or alternatively, individual heat modules 110 can be thermally coupled to one and only one of the combustion zones 106, or individual heat modules 110 can be thermally coupled to multiple combustion zones 106.

The system 100 can further include a controller 120 operably coupled to and/or configured to control the air source 102, air preheat module 104, combustion zones 106, fuel source 108, and/or heat module(s) 110. The controller can control, for example, (i) the air source 102 to control air flow to and/or from the combustion zones 106, (ii) the fuel source 108 to control fuel pressure and/or flow to the combustion zones 106, and (iii) the heat module(s) 110 to control temperatures thereof (e.g., hot side temperatures and/or cold side temperatures), heat input, and/or electricity generation. Embodiments of the controller 120 and/or technology described below may take the form of computer-executable instructions, including routines executed by a programmable computer. The controller 120 can include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems and/or be embodied in a special-purpose computer or data processor that is specifically programmed, configured or constructed to perform one or more of the computer-executable instructions and/or methods described below. Accordingly, the term "controller" as used herein can refer to any data processor. Information handled by the controller can be presented at any suitable display medium. The controller can be included in each of the other systems (e.g., the system 200, 300, 400, 600, 800, etc.) described herein, even if not shown or described with reference to the corresponding figures.

Figure 1B:
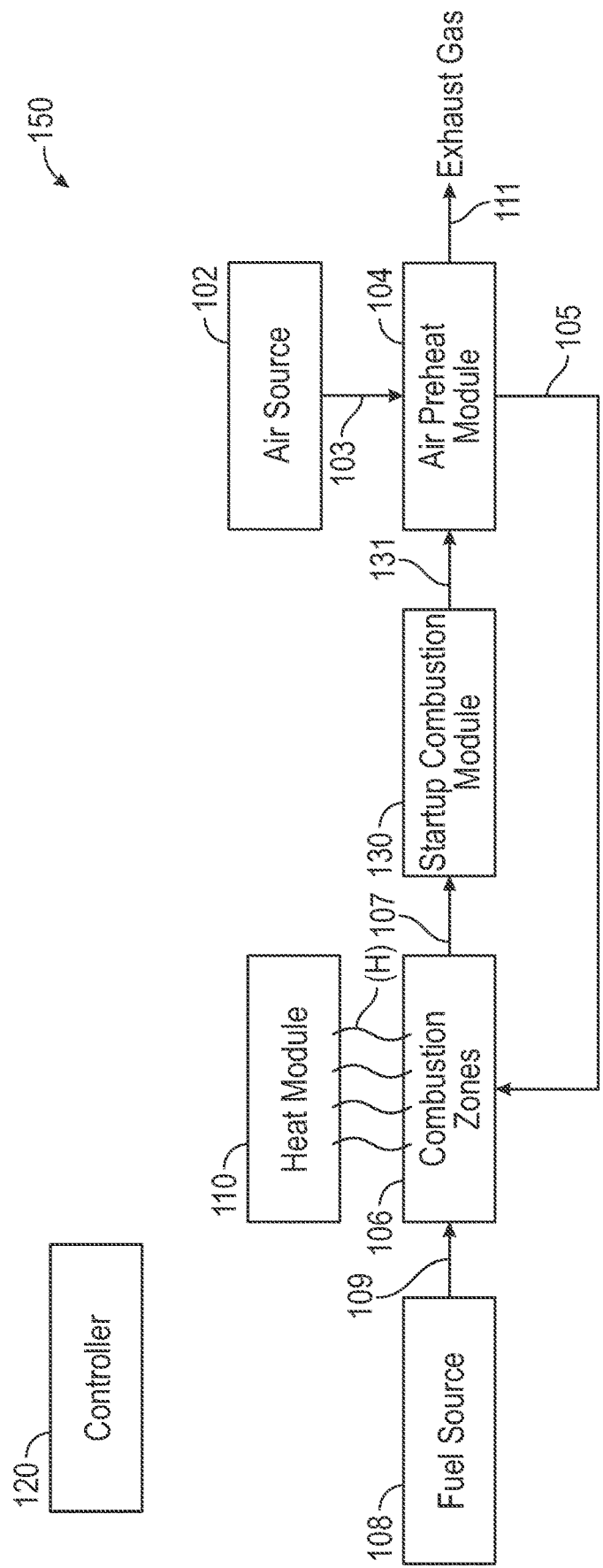

As previously described, the preheated air 105 is provided to the combustion zones 106 preferably above an auto-ignition temperature, and is heated via the heated exhaust gas 107. However, during initial startup, the system 100 is generally at or near ambient temperature. As such, in order to generate thermal mass, an ignition source and/or source of thermal mass is needed. FIG. 1B is a schematic block diagram of a system 150, in accordance with embodiments of the present technology. The system 150 includes features generally similar to those described with reference to FIG. 1A and system 100. As shown in FIG. 1B, the system 150 includes the air source 102, air preheat module, combustion zone 106, fuel source 108, heat module 110, and controller 120. The system 150 further includes a startup combustion module 130 downstream of the combustion zones 106, and configured to receive the heated exhaust gas 107 from the combustion zones 106 and produce a secondary exhaust gas 131 to be directed to the air preheat module 104. The startup combustion module 130 can include a burner of ignitor source ("burner") configured to cause combustion of the fuel 109 and preheated air 105, which may be at ambient temperature and/or not heated during startup operation.

In operation, the burner of the startup combustion module 130 can be ignited (e.g., via the controller 120) and begin to generate the heated exhaust gas 107. As the temperature of the heated exhaust gas 107 increases, more heat is transferred to the incoming air 103 and the preheated air 105 becomes hotter. As fuel provided to the burner and/or startup combustion module 130 is increased, the temperature of the preheated air 105 reaches the auto-ignition temperature and the burner is no longer needed. In some embodiments, the system 150 can include a valve arrangement that enables the startup combustion module 130 to be isolated and the heated exhaust gas 107 to be directed from the combustion zones 106 directly to the air preheat module 104 (i.e., without passing through the startup combustion module 130). During the startup operation, the air-to-fuel ratio may be the same or different as the overall air-to-fuel ratio during normal operation. In some embodiments, startup operation could entail operating at a relatively lower thermal power, e.g., to prevent overheating and/or reduce the required combustion volume.

Figure 2:
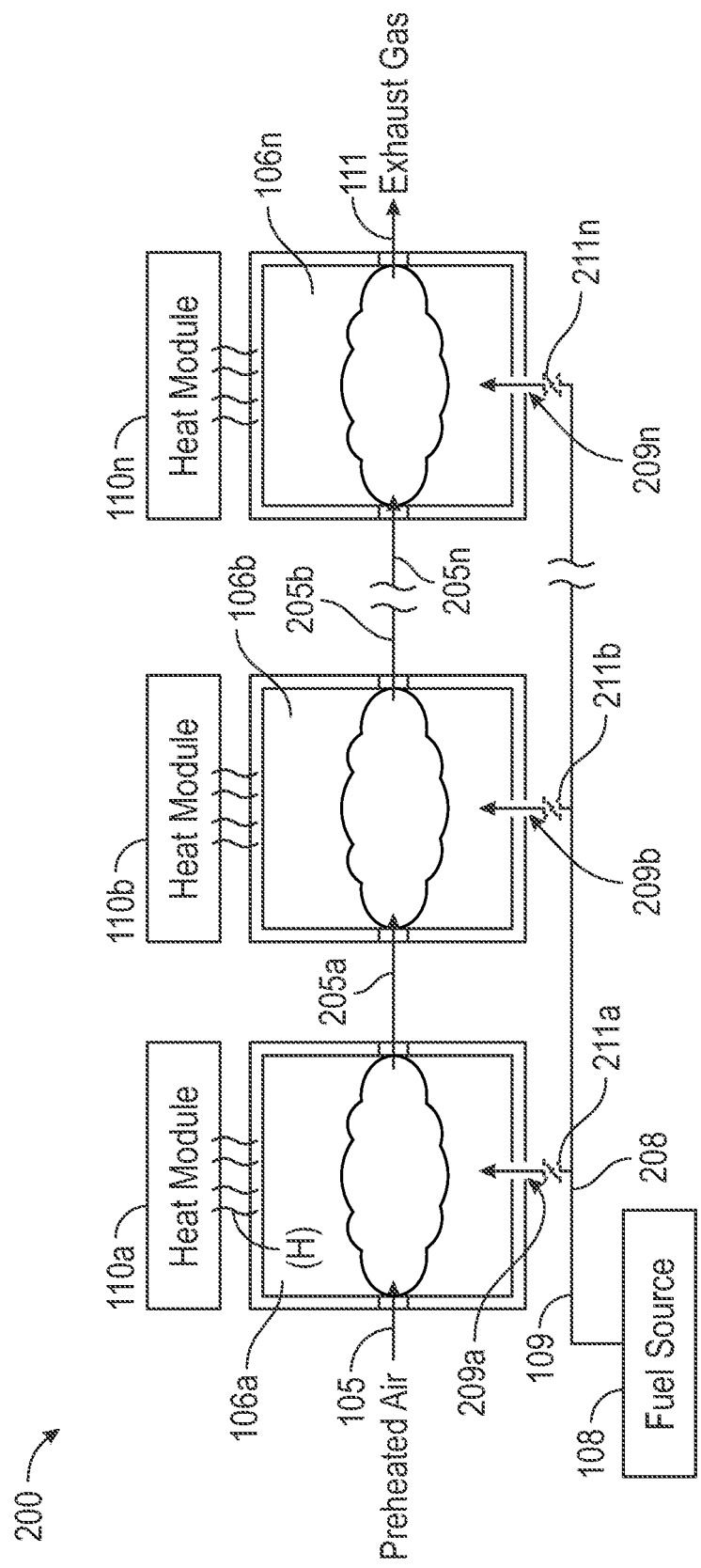

FIG. 2 is a schematic block diagram of a combustion device or system 200 ("system 200"), in accordance with embodiments of the present technology. The system 200 includes many of the features shown and described with reference to FIG. 1A and the system 100, including the fuel source 108, combustion zones 106a/b/n (collectively referred to as "combustion zones 106"), and heat modules 110a/b/n (collectively referred to as "heat modules 110"). As shown in FIG. 2, the system 200 includes a first combustion zone 106a configured to receive the preheated air 105 and produce a first exhaust gas 205a, a second combustion zone 106b configured to receive the first exhaust gas 205a and produce a second exhaust gas 205b, and a last combustion zone 106n configured to receive an exhaust gas 205n from the penultimate combustion zone and produce the exhaust gas 111. The preheated air 105 can have a temperature lower than each of the first exhaust gas 205a, the second exhaust gas 205b, the exhaust gas 205n, and the exhaust gas 111. The first exhaust gas 205a, the second exhaust gas 205b, the exhaust gas 205n, and the exhaust gas 111 can have a temperature above the auto-ignition temperature when mixed with the fuel, and/or within 10° C., 20° C., or 50° C. of each other. The last combustion zone 106n can correspond to a third, fifth, tenth, fiftieth, or hundredth combustion zone that is arranged in series relative to the other combustion zones.

The system 200 further includes a fuel manifold 208 fluidly coupled to the fuel source 108 and configured to provide the fuel 109 to each of the combustion zones 106. The fuel manifold 208 includes a first fuel input or opening 209a ("first fuel input 209a") configured to provide the fuel 109 to the first combustion zone 106a, a second fuel input or opening 209b ("the second fuel input 209a") downstream of the first fuel input 209a and configured to provide the fuel 109 to the second combustion zone 106b, and a last fuel input or opening 209n ("last fuel input 209n") downstream of the second fuel input 209b and configured to provide the fuel 109 to the last combustion zone 106n. In some embodiments, the first fuel input 209a can be larger than that of the second fuel input 209b and/or the last fuel input 209n, and as a result, the fuel 109 provided to the first combustion zone 106a via the first fuel input 209a can be greater (e.g., have a higher fuel flow rate) than the fuel 109 provided to the second or last combustion zones 106b/n via the respective second or last fuel inputs 209b/n. The first combustion zone 106a may need to receive additional fuel relative to the other combustion zones 106b/n because the first combustion zone 106a must increase the temperature of the mixture of preheated air and fuel more than that of the other combustion zones 106b/n.

In some embodiments, the fuel manifold 208 can include inlet valves to control the fuel input to the combustion zones 106. As shown in FIG. 2, the inlet valves can include a first inlet valve 211a at the first fuel input 209a, a second inlet valve 211b at the second fuel input 209b, and a last inlet valve 211n at the last fuel input 209n. Without being bound by theory, in some embodiments the flow rate and/or amount of fuel provided to the first combustion zone is based on the expected or required heat release from the first combustion zone. Additionally or alternatively, the flow rate and/or amount of fuel provided to subsequent combustion zones (e.g., the second combustion zone, third combustion zone, etc.) is based on the expected or required heat to be removed from that combustion zone.

Each of the combustion zones 106 is configured to combust the preheated air and/or exhaust gas with the fuel provided thereto. The flow rate of the preheated air 105 provided to the first combustion zone 106a can be set at or near stoichiometric conditions with respect to the overall fuel flow. Advantageously, operating at or near stoichiometric conditions enables minimal air flow which results in minimal pressure drop, thereby allowing more heat transfer to take place and/or more heat extraction via the heat modules. In some embodiments, the flow rate of the preheated air 105 provided to the first combustion zone 106a is set to enable complete combustion and/or result in minimal carbon monoxide (CO) emissions of the exhaust gas 111 from the final combustion zone 106n. The preheated air 105 provided to the first combustion zone 106a can serve as the only oxidant source for all the downstream combustion zones, as the exhaust gas 205a from the first combustion zone 106a is directed to the second combustion zone 106b, the exhaust gas 205b from the second combustion zone 106b is directed to the subsequent combustion zone, and so on. Doing so can advantageously limit the amount of excess air needed for each combustion zone, which limits the volume needed for combustion via each of the combustion zones.

The system 100 can further include heat modules 110, including a first heat module 110a thermally coupled to the first combustion zone 106a, a second heat module 110b thermally coupled to the second combustion zone 106b, and a last heat module 110n thermally coupled to the last combustion zone 106n. As previously described, each of the heat modules 110 can be thermally coupled to the corresponding combustion zone 106 via convection, conduction, and/or any other heat transfer means. As shown in FIG. 2, the heat modules are separate and spaced apart from one another. In some embodiments, the heat modules can be a single module thermally coupled to each of the combustion zones 106

Figure 3:
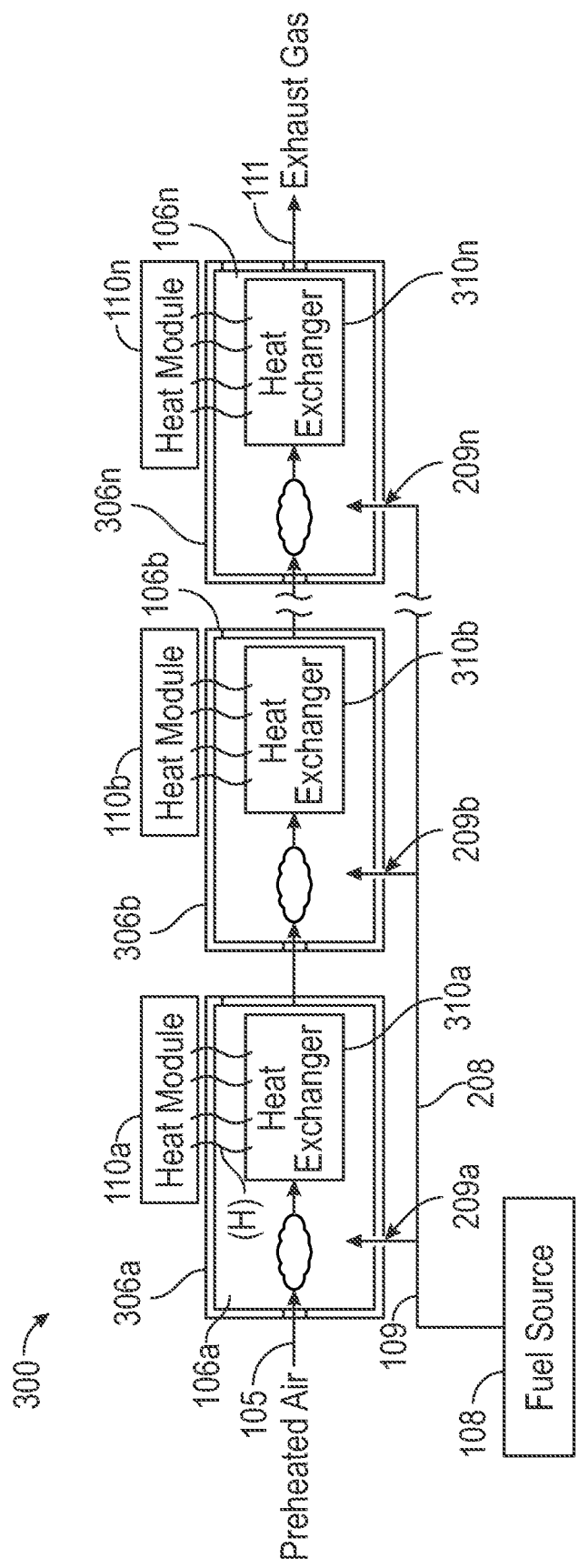

FIG. 3 is a schematic block diagram of a combustion device or system 300 ("system 300"), in accordance with embodiments of the present technology. The system 300 includes many of the features shown and described with reference to FIG. 2 and the system 200, including the fuel source 108, fuel manifold 208, fuel inputs 209 combustion zones 106, and heat modules 110. The system 300 further includes a plurality of heat exchangers, including a first heat exchanger 310a within a housing 306a of the first combustion zone 106a, a second heat exchanger 310b within a housing 306b of the second combustion zone 106b, and a last heat exchanger 310n within a housing 306n of the last combustion zone 106n. The first heat exchanger 310a, second heat exchanger 310b, and last heat exchanger 310n can each be positioned proximate and/or downstream to the combustion or combustion area of the preheated air 105 and fuel 109 within each of the respective combustion zones 106, and thus directly absorb heat from the combustion. Additionally or alternatively, the first heat exchanger 310a, second heat exchanger 310b, and last heat exchanger 310n can each be thermally coupled to the respective first heat module 110a, second heat module 110b, and last heat module 110n. As described herein, the first heat exchanger 310a, second heat exchanger 310b, and last heat exchanger 310n can each be fin-type heat exchangers, plate-type heat exchangers, or other heat exchanger designs.

Figure 4:
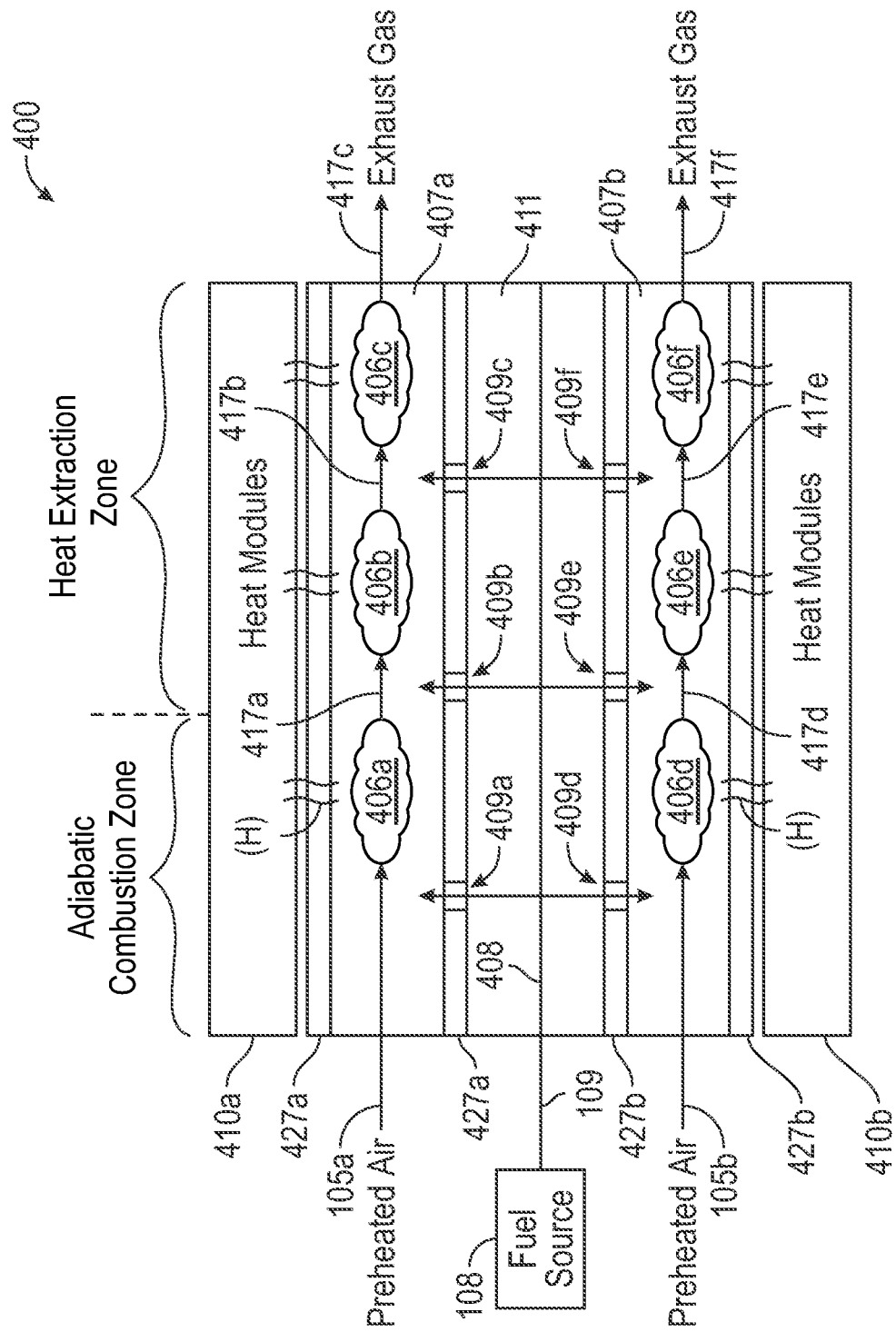

FIG. 4 is a schematic block diagram of a combustion device or system 400 ("system 400"), in accordance with embodiments of the present technology. The system 400 includes features generally similar to those described with reference to FIGS. 1-3 and systems 100, 200, 300. As shown in FIG. 4, the system 400 includes a fuel chamber 411 configured to receive the fuel 109 from the fuel source 108, one or more combustion channels 407a/b ("combustion channel(s) 407") configured to receive the preheated air 105a/b (collectively referred to as "preheated air 105"), and one or more heat modules 410a/b ("heat module(s) 410") thermally coupled to the combustion channel(s) 407. The heat modules 410 can be identical to the heat modules 110 described with reference to FIGS. 1-3 and include any of the features and/or functionality described. As shown in FIG. 4, the combustion channel(s) 407 can be peripheral to (e.g., outward of and/or radially outward of) the fuel chamber 411, and the heat module(s) 410 can be peripheral to the combustion channel(s) 407 and/or the fuel chamber 411. In some embodiments, the combustion channels 407a/b can correspond to a single channel and the heat modules 410a/b can correspond to a single heat module, e.g., when the system 400 has a cylindrical or circular shape.

The combustion channel(s) 407a/b can include a respective combustion housing 427a/b and can support combustion of the preheated air 105 and the fuel 109, which is injected at multiple points along a dimension (e.g., a length) of the combustion channel(s) 407. For example, for the combustion channel 407a, the fuel 109 can be injected therein via a fuel manifold 408 at a first fuel input 409a, a second fuel input 409b downstream of the first fuel input 409a, and a third fuel input 409c downstream of the second fuel input 409b. Similarly, for the combustion channel 407b, the fuel 109 can be injected therein via the fuel manifold 408 at a fourth fuel input 409d, a fifth fuel input 409e downstream of the fourth fuel input 409d, and a sixth fuel input 409f downstream of the fifth fuel input 409e. Combustion can occur at areas or zones along the dimension of the combustion channel 407a/b that generally correspond to the fuel inputs, such as at a first combustion zone 406a, a second combustion zone 406b downstream of the first combustion zone 406a, a third combustion zone 406c downstream of the second combustion zone 406b, a fourth combustion zone 406d, a fifth combustion zone 406e downstream of the fourth combustion zone 406d, and a sixth combustion zone 406f downstream of the fifth combustion zone 406e (collectively referred to as "combustion zones 406").

At each of the combustion zones 406, combustion of the preheated air 105 and all or a majority of the corresponding fuel available at that point of the combustion channel 407 can occur to produce a corresponding exhaust gas. As explained herein, the exhaust gas can include excess air and be provided to the subsequent combustion zone for further combustion once additional fuel is available. As shown in FIG. 4, for the combustion channel 407a the exhaust gas can include a first exhaust gas 417a generated via the first combustion zone 406a and provided to the second combustion zone 406b, a second exhaust gas 417b generated via the second combustion zone 406b and provided to the third combustion zone 406c, and a third exhaust gas 417c generated via the third combustion zone 407c. Similarly for the combustion channel 407b, the exhaust gas can include a fourth exhaust gas 417d generated via the fourth combustion zone 406d and provided to the fifth combustion zone 406e, a fifth exhaust gas 417e generated via the fifth combustion zone 406e and provided to the sixth combustion zone 406f, and a sixth exhaust gas 417f generated via the sixth combustion zone 407f. The third and sixth exhaust gases 417c/f can correspond to the exhaust gas 111 (FIGS. 1-3) previously described. A person of ordinary skill will appreciate that while the system 400 includes three combustion zones in each of the combustion channels 407a/b, other embodiments can include any number of combustion zones (e.g., two combustion zones, five combustion zones, ten combustion zones, fifty combustion zones, etc.)

The heat module(s) 410a/b can absorb heat from the respective combustion channel(s) 407a/b, or more specifically from the combustion zones 406 of the combustion channel(s) 407a/b, along the dimension of the combustion channel(s) 407a/b. The heat module(s) 410a/b are each shown as a single module in FIG. 4. However, in some embodiments, each of the heat modules 410a/b can correspond to multiple heat modules spaced apart from one another and/or positioned over individual ones of the combustion zones 406. The area generally around the first combustion zone 406a (or fourth combustion zone 406d) can correspond to an "Adiabatic Combustion Zone" and the areas generally around the downstream combustion zones 406b/c (or combustion zones 406e/f) can correspond to a "Heat Extraction Zone," as described elsewhere herein.

Embodiments of the present technology (e.g., as described in FIGS. 1-4 and/or systems 100, 200, 300, 400) have multiple benefits over other combustion devices or systems. For example, by distributing the fuel to different combustion zones spaced along a dimension of the combustion system, while also absorbing heat from the combustion zones, the combustion gas temperatures and variation in combustion gas temperatures can be minimized. In doing so, issues associated with excessive $NO_x$ emissions can be mitigated. Additionally, by promoting combustion within the combustion zones and feeding the exhaust gas of each combustion zone into a subsequent combustion zone, embodiments of the present technology enable lean combustion conditions (e.g., low fuel concentration and/or low fuel:air ratios) for each of the combustion zones along a length of the combustion channel 407, without having to rely on excess air. Stated differently, in part because the exhaust gas of each combustion zone is directed to subsequent combustion zones, the preheated air provided to the first combustion zone can be set at or near stoichiometric conditions with respect to overall fuel flow. As a result, pressure drop of the combustion gas is minimized, and, by spreading combustion of the preheated air and fuel across multiple combustion zones, the surface area for absorbing heat from combustion is increased, thus (i) improving the ability to capture more heat, (ii) increasing overall extracted heat flux, and (iii) limiting the amount of heat that is wasted.

Figure 5A:
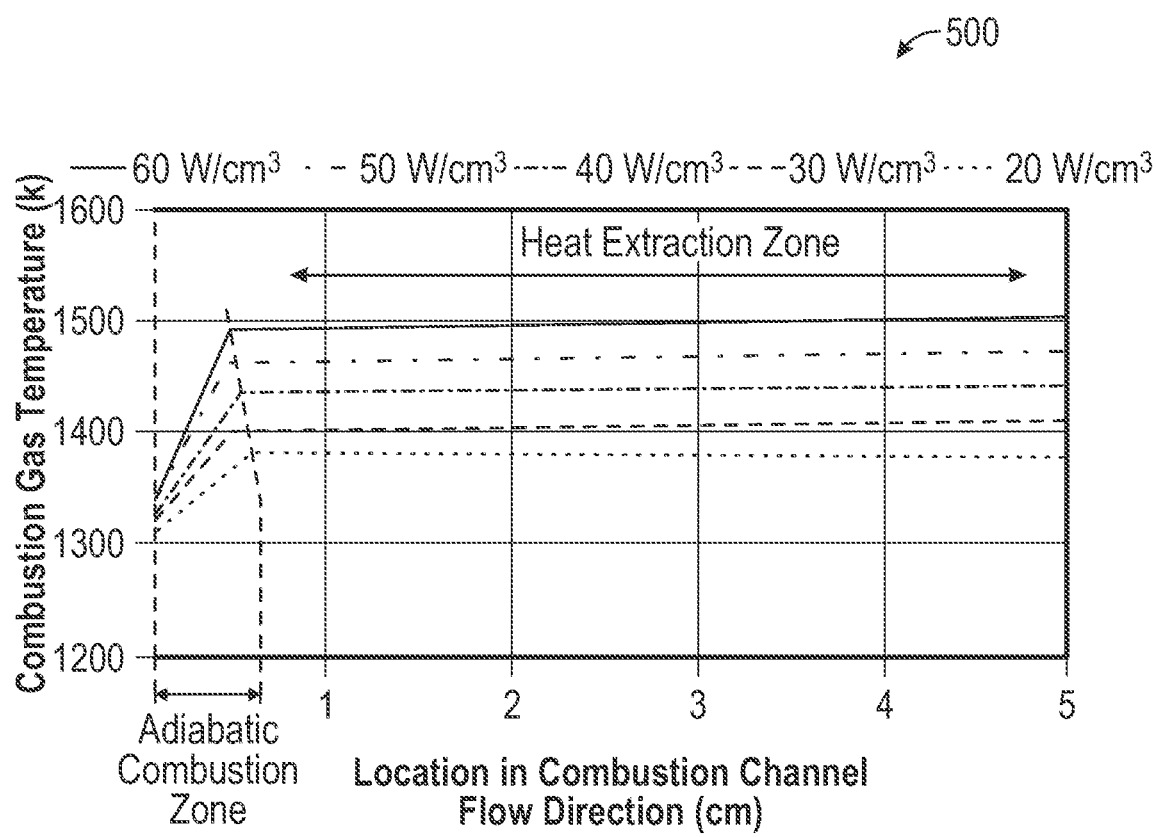
FIG. 5A is a chart illustrating temperature distribution along a combustion channel of the combustion system shown in FIG. 4 for various combustion heat release densities.
Figure 5B:
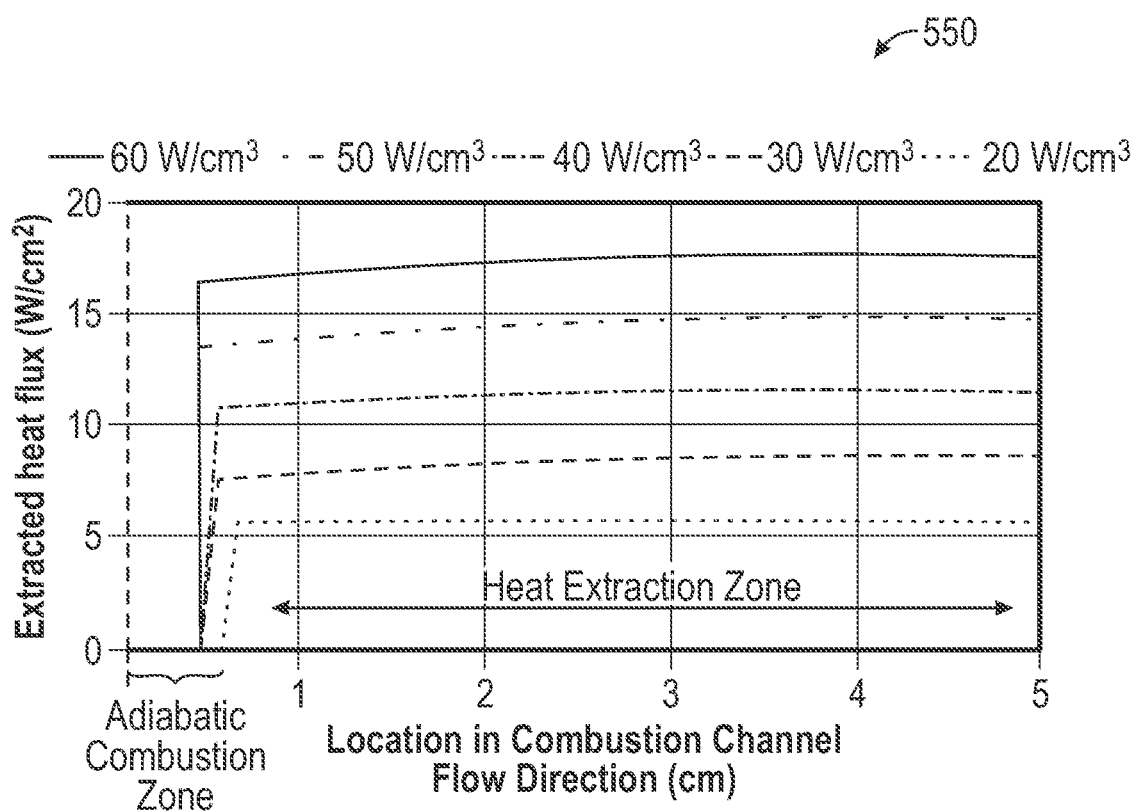
FIG. 5B is a chart illustrating heat flux supported by combustion heat along the combustion channel of the combustion system shown in FIG. 4 for various combustion heat release densities.

FIG. 5A is a chart 500 illustrating temperature distribution along the combustion channel of the combustion system shown in FIG. 4 for various combustion heat release densities, and FIG. 5B is a chart 550 illustrating heat flux supported by combustion heat along the combustion channel of the combustion system shown in FIG. 4 for various combustion heat release densities. For FIGS. 5A and 5B, the temperature of the heat transfer surface in the heat extraction zones was assumed to be about 1000° C. Referring first to FIG. 5A, the chart 500 includes five lines each corresponding to a different combustion heat release density, including 20 Watts (W)/cubic centimeter ($cm^3$), 30 $W/cm^3$, 40 $W/cm^3$, 50 $W/cm^3$, and 60 $W/cm^3$. The Adiabatic Combustion Zone generally corresponds to the first combustion zone 406a or first combustion that takes place in the combustion channel, and the Heat Extraction Zone corresponds to the remaining combustion zones 406b/c/d that take place afterward or downstream. As shown in FIG. 5A, the combustion temperature increases within the Adiabatic Combustion Zone (e.g., due to combustion and because heat is not being absorbed via heat modules) up to a particular temperature of about 1495 Kelvin (K) for the 60 $W/cm^3$ combustion heat release density and 1380K for the 20 $W/cm^3$ combustion heat release density. The combustion temperature is higher as the combustion heat release density increases (e.g., the highest combustion temperature is for the highest combustion heat release density of 60 $W/cm^3$). After the initial adiabatic combustion zone to efficiently raise the gas temperature follows the heat extraction zone which in this example also have further combustion occurring to balance the heat removed by the heat module as illustrated in FIG. 2. For that reason the combustion gas temperatures remain fairly constant and/or increase only slightly (e.g., no more than 10K or 20K variance) within the following Heat Extraction/Combustion Zones. The minimal combustion gas temperature fluctuations along the combustion/heat extraction zone enables uniform heat exchanger geometries due to a constant temperature difference. The combustion gas temperature can be tailored towards specific requirement from application in terms of absolute numbers and variations from combustion zone to combustion zone by varying fuel concentration.

Referring next to FIG. 5B, the chart 550 includes five lines each corresponding to a different heat combustion heat release density, including 20 $W/cm^3$, 30 $W/cm^3$, 40 $W/cm^3$, 50 $W/cm^3$, and 60 $W/cm^3$. The Adiabatic Combustion Zone generally corresponds to the first combustion zone 406a (or fourth combustion zone 406d) or first combustion that takes place in the combustion channel, and the Heat Extraction Zone corresponds to the remaining combustion zones 406b/c (or combustion zones 406e/f) that take place afterward or downstream. As shown in FIG. 5B, the extracted heat flux increases during the Adiabatic Combustion Zone up to a particular heat flux between about 17 $W/cm^2$ for the 60 $W/cm^3$ flux and 5 W/cm3 for the 20 $W/cm^3$ heat release density, and the extracted heat flux is higher as the combustion heat release density increases due to increased combustion gas temperature (e.g., the highest heat flux is for the highest combustion heat release density of 60 $W/cm^3$). Within the Heat Extraction Zone, these heat fluxes remain fairly constant and/or increase only slightly (e.g., no more than 3 $W/cm^2$) during the remaining combustion.

Figure 6:
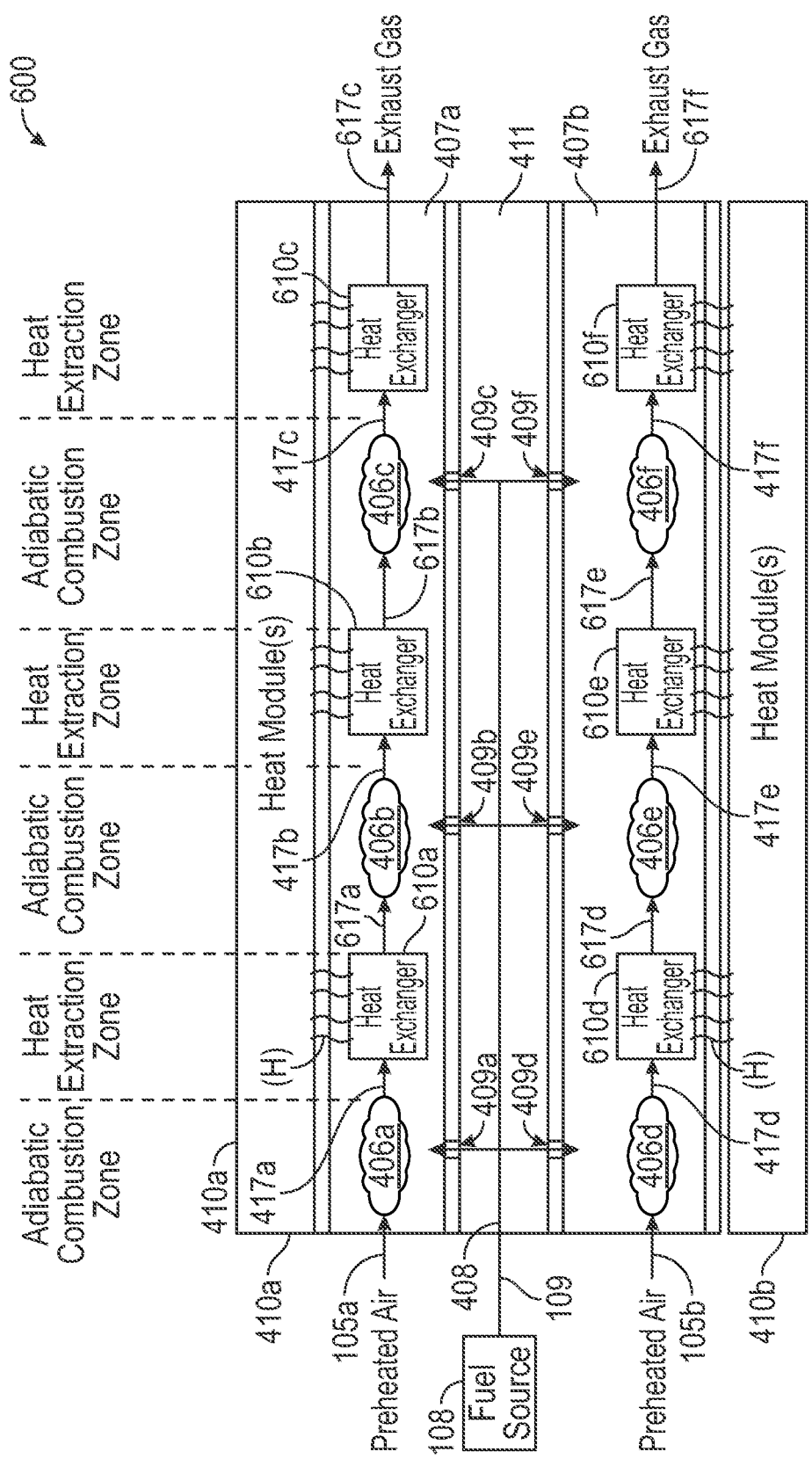
FIG. 6 is a schematic block diagram of another combustion system, in accordance with embodiments of the present technology.

FIG. 6 is a schematic block diagram of another combustion device or system 600 ("system 600"), in accordance with embodiments of the present technology. The system 600 includes many of the features shown and described with reference to FIG. 4 and the system 400, including the fuel source 108, fuel manifold 408, combustion zones 406, heat modules 410a/b, fuel inputs 409, and fuel chamber 411. The system 600 further includes heat exchangers, including a first heat exchanger 610a, a second heat exchanger 610b, and a third or last heat exchanger 610c ("third heat exchanger 610c") all within the first combustion channel 407a, as well as a fourth heat exchanger 610d, a fifth heat exchanger 610e, and a sixth or last heat exchanger 610f ("sixth heat exchanger 610f") all within the second combustion channel 407b. The heat exchangers are collectively referred to as "heat exchangers 610," and can each be positioned proximate and/or downstream to the corresponding combustion or combustion zone area of the preheated air 105 and fuel 109 within each of the respective combustion zones 406, and thus directly absorb heat from the combustion. As shown in FIG. 6, the first heat exchanger 610a receives the first exhaust gas 417a from the first combustion zone 406a and produces a first heat exhaust gas 617a, the second heat exchanger 610b receives the second exhaust gas 417b from the second combustion zone 406b and produces a second heat exhaust gas 617b, the third heat exchanger 610c receives the third exhaust gas 417c from the third combustion zone 406c and produces a third heat exhaust gas 617c, the fourth heat exchanger 610d receives the fourth exhaust gas 417d from the fourth combustion zone 406d and produces a fourth heat exhaust gas 617d, the fifth heat exchanger 610e receives the fifth exhaust gas 417e from the fifth combustion zone 406e and produces a fifth heat exhaust gas 617e, and the sixth heat exchanger 610f receives the sixth exhaust gas 417f from the sixth combustion zone 406f and produces a sixth heat exhaust gas 617f. In operation, each of the heat exchangers 610 absorbs heat from the upstream combustion.

The first heat exchanger 610a, second heat exchanger 610b, and third heat exchanger 610c can each be thermally coupled to the first heat module 410a, and the fourth heat exchanger 610d, fifth heat exchanger 610e, and sixth heat exchanger 610d can each be thermally coupled to the second heat module 410b. The heat module(s) 410a/b can absorb heat from the respective combustion channel(s) 407a/b, or more specifically from the corresponding heat exchangers 610 of the combustion channel(s) 407a/b, along the dimension of the combustion channel(s) 407a/b. The areas of the system 600 generally around the combustion zones 406 can correspond to the "Adiabatic Combustion Zones" and the areas generally around the heat exchangers 610 can correspond to the "Heat Extraction Zones," as described herein.

The embodiments described with reference to the system 600 have many of the multiple benefits described elsewhere herein. For example, by distributing the fuel to different combustion zones spaced along a dimension of the combustion system, while also absorbing heat from the combustion zones, issues associated with excessive $NO_x$ emissions can be mitigated and lean combustion conditions are enabled for each of the combustion zones without having to rely on excess air. Moreover, because the heat exchangers 610 are incorporated within the combustion channel 407, high heat flux extraction is made possible and the amount of waste heat is minimized.

Figure 7A:
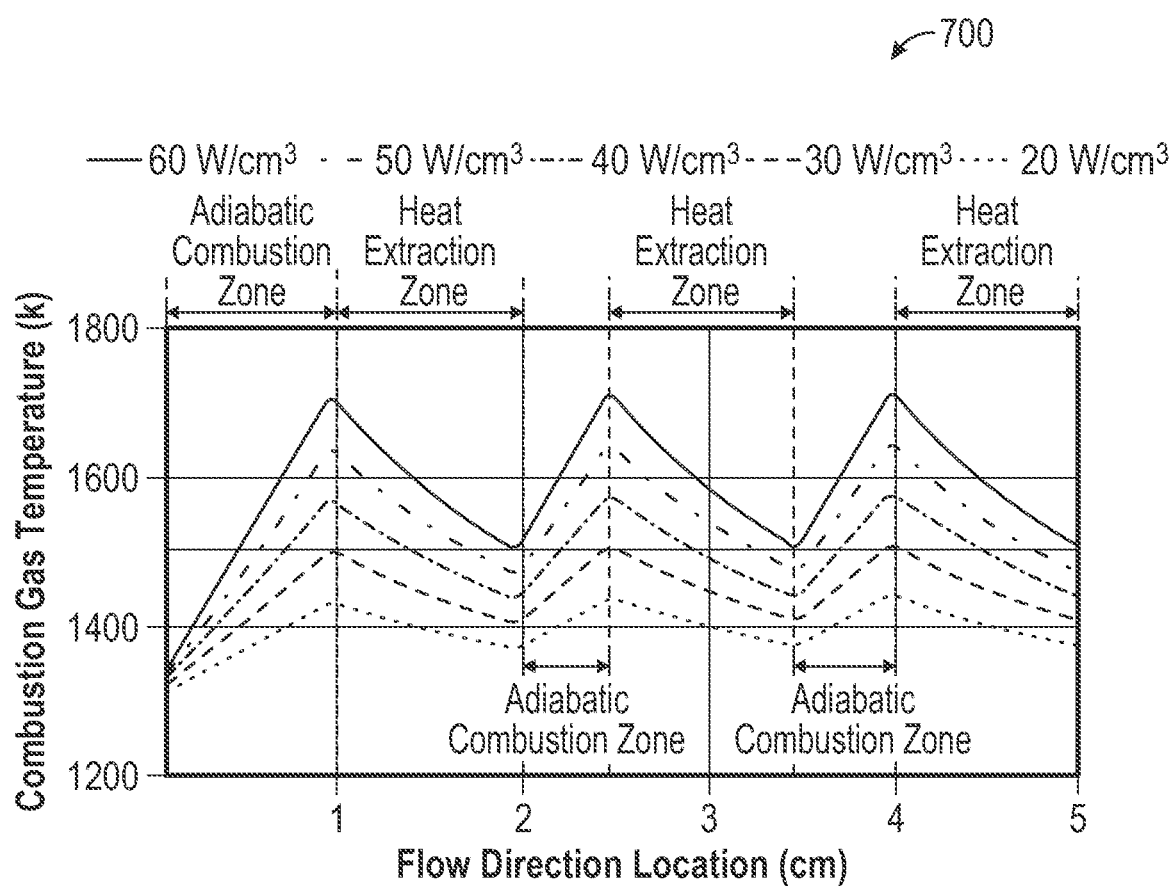
FIG. 7A is a chart illustrating temperature distribution along the combustion channel of the combustion system shown in FIG. 6 for various combustion heat release densities.
Figure 7B:
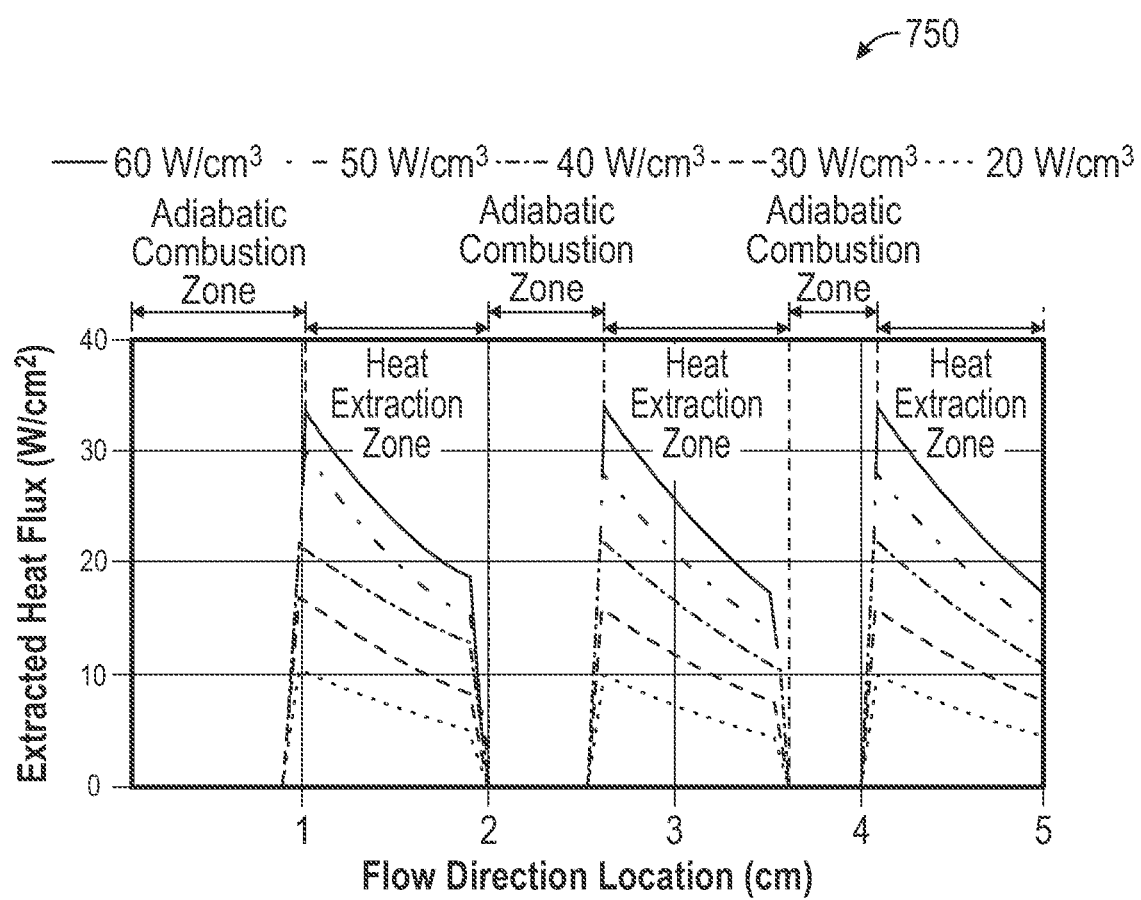
FIG. 7B is a chart illustrating heat flux supported by combustion heat along the combustion channel of the combustion system shown in FIG. 6 for various combustion heat release densities.

FIG. 7A is a chart illustrating temperature distribution along the combustion channel of the combustion system shown in FIG. 6 for various combustion heat release densities, and FIG. 7B is a chart 750 illustrating heat flux supported by combustion heat along the combustion channel of the combustion system shown in FIG. 6 for various combustion heat release densities. For FIGS. 7A and 7B, the temperature of the heat transfer surface in the heat extraction zones was assumed to be about 1000° C. Referring first to FIG. 7A, the chart 700 includes five lines each corresponding to a different combustion heat release density, including 20 W/cm$^3$, 30 W/cm$^3$, 40 W/cm$^3$, 50 W/cm$^3$, and 60 W/cm$^3$. The Adiabatic Combustion Zones generally correspond to each of the combustion zones 406 (FIG. 6) that takes place in the combustion channel 407a/b (FIG. 6), and the Heat Extraction Zones generally correspond to the areas downstream of the combustion zones 406 at which the heat of combustion is absorbed via the heat exchangers 610 (FIG. 6) and/or the heat modules 410a/b (FIG. 6). The combustion temperature increases and then decreases to form temperature maximums, with the first maximum at about 1 cm exhibiting the greatest rise in temperature and subsequent peaks exhibiting similar temperature rises as one another. As shown in FIG. 7A, the maximum temperature and minimum temperature for each of the different combustion heat release densities remains approximately the same (e.g., no more than 10K or 20K variance) even as the flow direction location increases.

Referring next to FIG. 7B, the chart 750 includes the same five lines of the chart 700. As such, the Adiabatic Combustion Zones generally correspond to each of the combustion zones 406 (FIG. 6) that takes place in the combustion channel 407a/b (FIG. 6), in which there is limited or no heat extraction from the heat of combustion. The Heat Extraction Zones generally correspond to the areas downstream of the combustion zones 406 (FIG. 6) at which the heat of combustion is absorbed via the heat exchangers 610 (FIG. 6) and/or the heat modules 410a/b (FIG. 6). As such, the combustion gas temperature generally increases in the adiabatic combustion zones and then decreases in the heat extraction zones, e.g., wherein heat is absorbed via the heat modules. Specifically, for the 60 W/cm$^3$ combustion heat release density, the extracted heat flux increases in response to the combustion of the preheated air and fuel of the first combustion zone 406a (FIG. 6) to about 30 W/cm$^2$, decreases in response to heat absorption via the first heat exchanger to about 19 W/cm$^2$, and then further decreasing in response to no or little heat being extracted between the area downstream of the first heat exchanger 610a and the subsequent second combustion zone 406b (FIG. 6). As shown in FIG. 7B, the maximum extracted heat flux, and the general increase and decrease of the extracted heat flux, is fairly consistent for each cycle of combustion zone and heat exchanger even as the flow direction location increases.

Figure 8A:
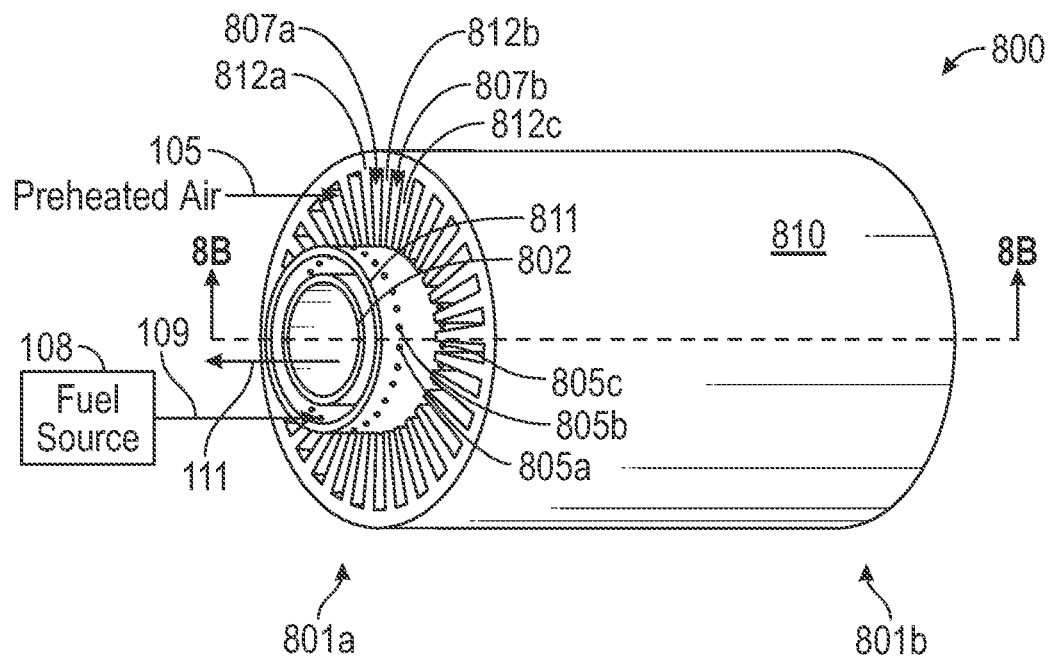
FIGS. 8A-8C are partially schematic representations of a combustion device, in accordance with embodiments of the present technology.
Figure 8B:
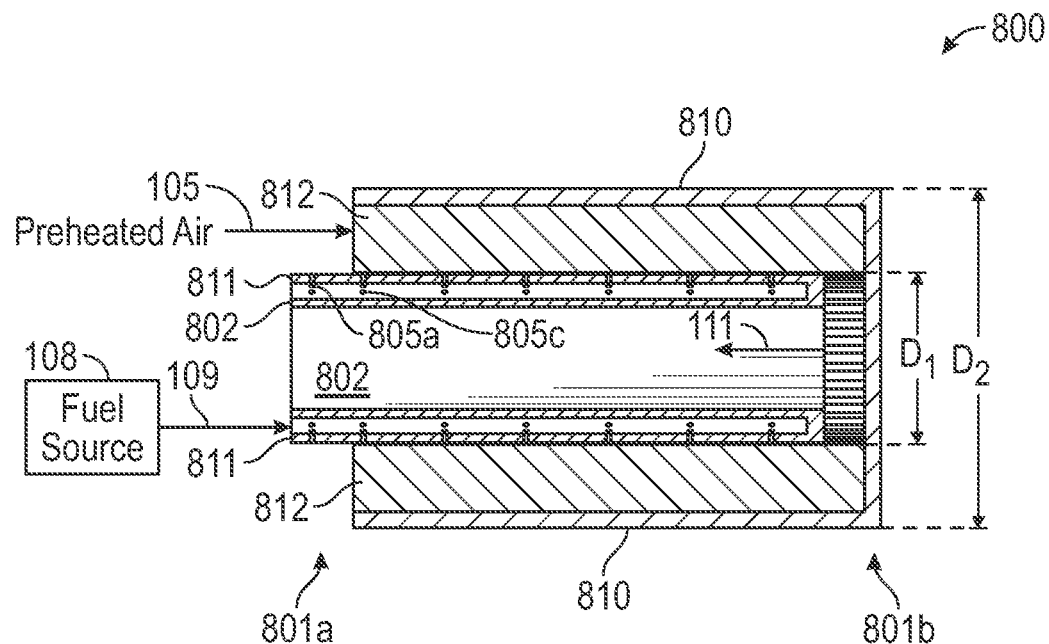
Figure 8C:
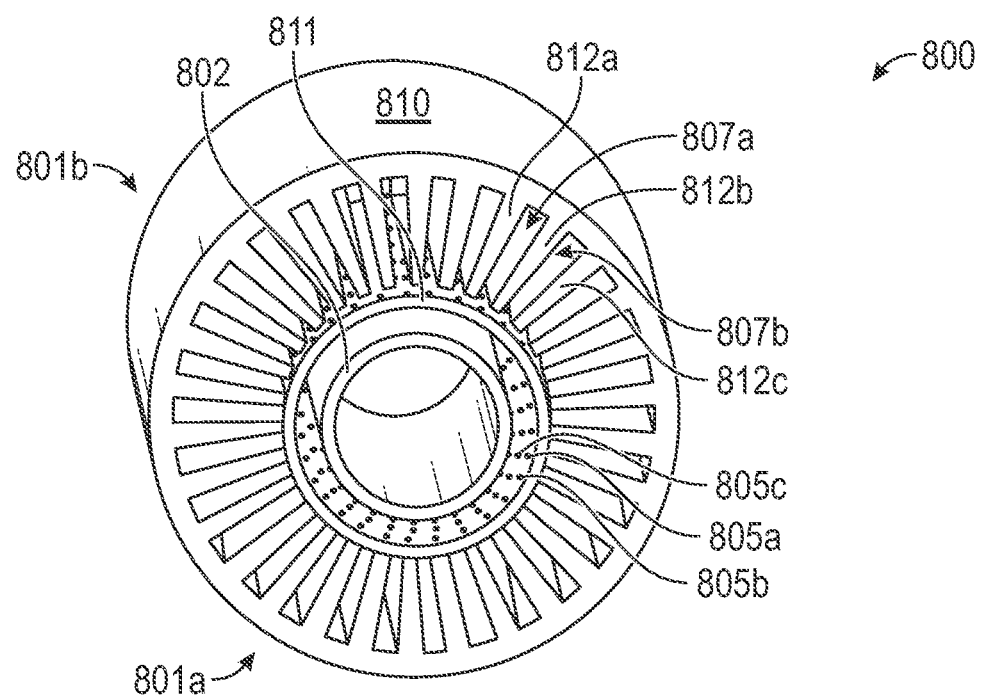

FIGS. 8A-8C are partially schematic representations of a combustion device 800 ("device 800"), in accordance with embodiments of the present technology. Specifically, FIG. 8A is a side isometric view of the device 800, FIG. 8B is a side cross-sectional view of the device 800 along the line 8B of FIG. 8A, and FIG. 8C is a front isometric view of the device 800. The device 800 can generally correspond to any one of the systems 100, 200, 300, 400, 600 described herein and can include one or more of the features described with respect to the systems 100, 200, 300, 400, 600. For example, the device 800 can include and/or be operably coupled to the controller 120 described with respect to FIG. 1A.

Referring to FIGS. 8A-8C together, the device 800 includes a first end portion 801a, a second end portion 801b opposite the first end portion 801a, a central or intermediate elongate channel 802, a hollow elongate fuel chamber 811 (e.g., the fuel chamber 411) peripheral to and/or surrounding at least a portion of the channel 802, and an elongate combustion module 810 peripheral to and/or surrounding at least a portion of the fuel chamber 811. The combustion module 810 can extend along an entire dimension (e.g., length) of the fuel chamber 811. The combustion module 810 can correspond to the combustion zones (e.g., combustion zones 106, 406) and/or the heat exchangers (e.g., heat exchangers 310, 610) described elsewhere herein.

The fuel chamber 811 can have a chamber housing configured to receive the fuel 109 from the fuel source 108, e.g., at an interior area defined by an inner surface of the fuel chamber 811 and/or an outer surface of the channel 802. The fuel chamber 811 can include multiple openings of fuel inputs 805*a/b/c* ("openings"; collectively referred to as "openings 805") which enable fuel to pass from the fuel chamber 811 to the combustion module 810. The openings 805 can be spaced apart laterally from one another, as the first opening 805*a* and the second opening 805*b* are, as well as along a length of the fuel chamber 811, as the first opening 805*a* and the third opening 805*c* are. In some embodiments, the first opening 805*a* aligns with an area of the combustion module 810 that corresponds to a first combustion zone (e.g., the first combustion zone 106*a*), and the third opening aligns with an area of the combustion module 810 that corresponds to a second combustion zone (e.g., the second combustion zone 106*b*) downstream of the first combustion zone and configured to receive an exhaust gas (e.g., the first exhaust gas 205*a*) from the first combustion zone. Additional combustion zones (e.g., third combustion zones, tenth combustion zones, fiftieth combustion zones, etc.) can be included downstream of the second combustion zone, as described herein.

The combustion module 810 can have an outer surface and a combustion housing configured to receive the preheated air 105 and enable combustion of the preheated air 105 with the fuel 109 received via the openings 805 of the fuel chamber 811. The fuel 109 is provided from the fuel chamber 811 to the combustion module 810 via the openings 805 along the length of the combustion module 810, and the preheated air 105 reacts with the fuel to form the exhaust gas 111. The combustion module 810 can include multiple fins or arms, such as fins or arms 812*a/b/c* (collectively referred to as "fins 812"), and combustion channels, such as combustion channels 807*a/b* (collectively referred to as "combustion channels 807"). Individual combustion channels can be defined by adjacent fins. For example, as shown in FIGS. 8A and 8C, fins 812*a/b* define a first combustion channel 807*a*, and fins 812*b/c* define a second combustion channel 807*b*. Each of the combustion channels 807 can extend along an entire length of the device 800. In some embodiments, one or more of the fins 812 and/or the combustion channels 807 extends only along a portion of the length of the device 800. Additionally or alternatively, individual combustion channels 807 can extend different lengths of the device 800 relative to each other. The combustion channels 807 can support and confine multiple combustion zones (e.g., the first combustion zone 106*a*, 406*a*) that may be generally aligned with areas that align with corresponding openings 805, as described elsewhere herein.

As shown in FIG. 8A, the fins 812 and the combustion channels 807 are retracted relative to an end of the fuel chamber 811 and/or the channel 802. Stated differently, a proximal end of the fins 812 and/or the combustion channels 807 is distal to a proximal end of fuel chamber 811 and/or the channel 802. In such embodiments, heat is not absorbed via the fins 812 in the proximal most combustion zone aligned with the openings 805*a/b*, which can allow the temperature in that area (e.g., an adiabatic combustion zone) of the device 800 to increase faster and/or sufficiently for downstream combustion zones. It is worth noting the outer surface of the combustion module 810 can extend, and typically does extend, over the proximal end of the fuel chamber 811 and/or the channel 802, e.g., to contain combustion within the combustion module 810.

As the preheated air 105 combusts with the fuel 109 within the combustion channels 807 at different combustion zones along a length of the combustion module 810 (e.g., in a direction from the first end portion 801*a* to the second end portion 801*b*), the exhaust gas 111 is generated. As best shown in FIG. 8B, at or near the second end portion 801*b*, the exhaust gas 111 from the last combustion zone within the combustion channel 812 is directed laterally inward to the channel 802 and then travels from the second end portion 801*b* toward the first end portion 810*b*. The exhaust gas 111 can be directed from the channel 802 toward an air preheat module (e.g., the air preheat module 104) to preheat the air to be received by the combustion channel 812. In some embodiments, the exhaust gas 111 in the channel 802 can heat the fuel 109 (e.g., hydrogen), which is in the adjacent fuel chamber 811 and traveling counter-current to the exhaust gas 111 in the channel 802. In other embodiments, the channel 802 can comprise insulation and/or otherwise be configured such that the exhaust gas 111 in the channel 802 does not heat the fuel 109 in the fuel chamber 811. In some embodiments the channel 802 is omitted and not included in the device 800, and in such embodiments the exhaust gas 111 may exit the second end portion 801*b* of the device 800.

Referring to FIG. 8B, the fuel chamber 811 can include a first diameter ($D_1$) and the combustion module 810 can include a second diameter ($D_2$). The first diameter can be about 1 inch and the second diameter can be about 2 inches. The size of the first and second diameters can be designed to ensure a predetermined amount of heat transfer from the combustion occurring within the combustion channels 812 (FIGS. 8A, 8C) to the fins 812. For example, in some embodiments the first and second diameters can be determined at least in part on a surface enhancement multiple of the surface area of the fins 812 relative to the surface area of the first diameter (e.g., the inner diameter) fuel chamber 811. In such embodiments, the surface enhancement multiple can be at least 4, 5, 6, 7, 8, 9, or 10, or within a range of 5-10 (or any incremental value therebetween).

The device 800 can further include heat modules (e.g., the heat modules 110, 410) and/or the heat exchangers (e.g., the heat exchangers 310, 610) that are thermally coupled to the combustion module 810 (e.g., via convection, conduction, and/or any other heat transfer means) and configured to absorb heat therefrom. As described herein, the heat modules and/or heat exchangers can be or include a heat engine, a heat-to-electricity converter, a TEC, an AMTEC, a TPV, TC, and/or a fuel cell. Additionally or alternatively, the heat modules and/or heat exchangers can utilize the absorbed heat from the combustion module 810 to enable chemical processing, including promoting or enabling endothermic reactions, syngas manufacturing, hydrogen production, hydrolysis, steam generation, boiling, melting, and/or methane cracking.

Figure 9A:
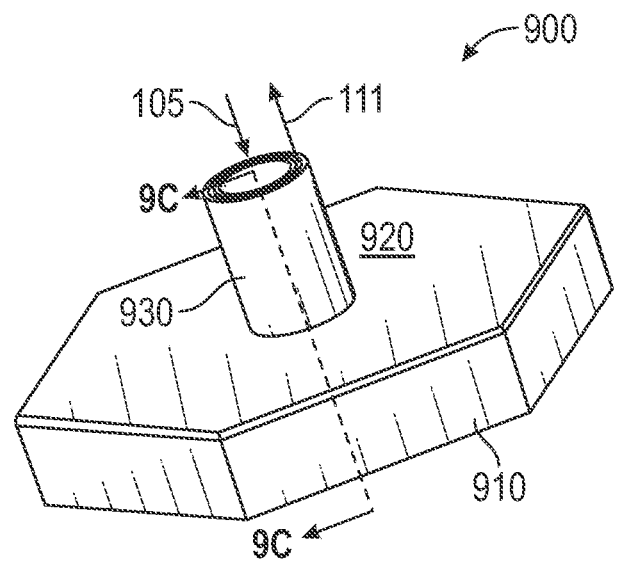
FIGS. 9A-9C are various representations of another combustion system, in accordance with embodiments of the present technology.
Figure 9B:
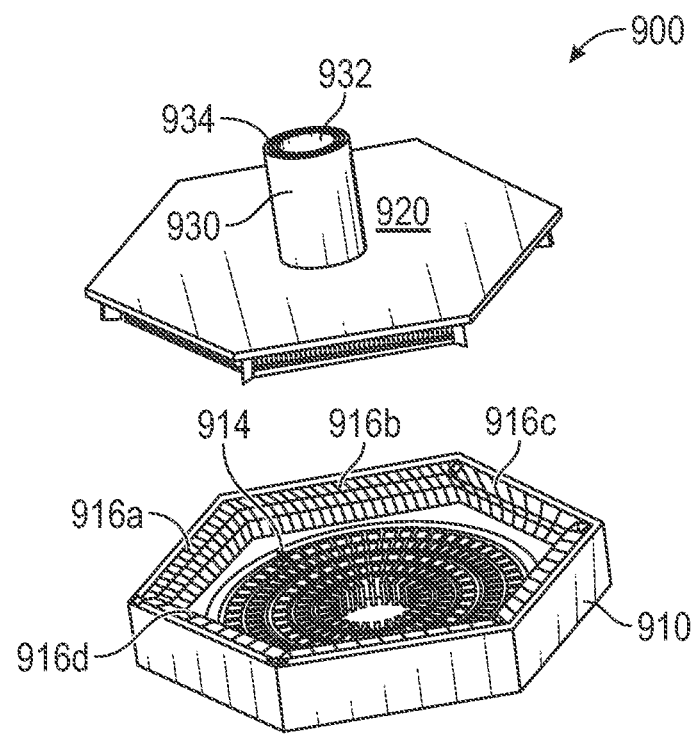
Figure 9C:
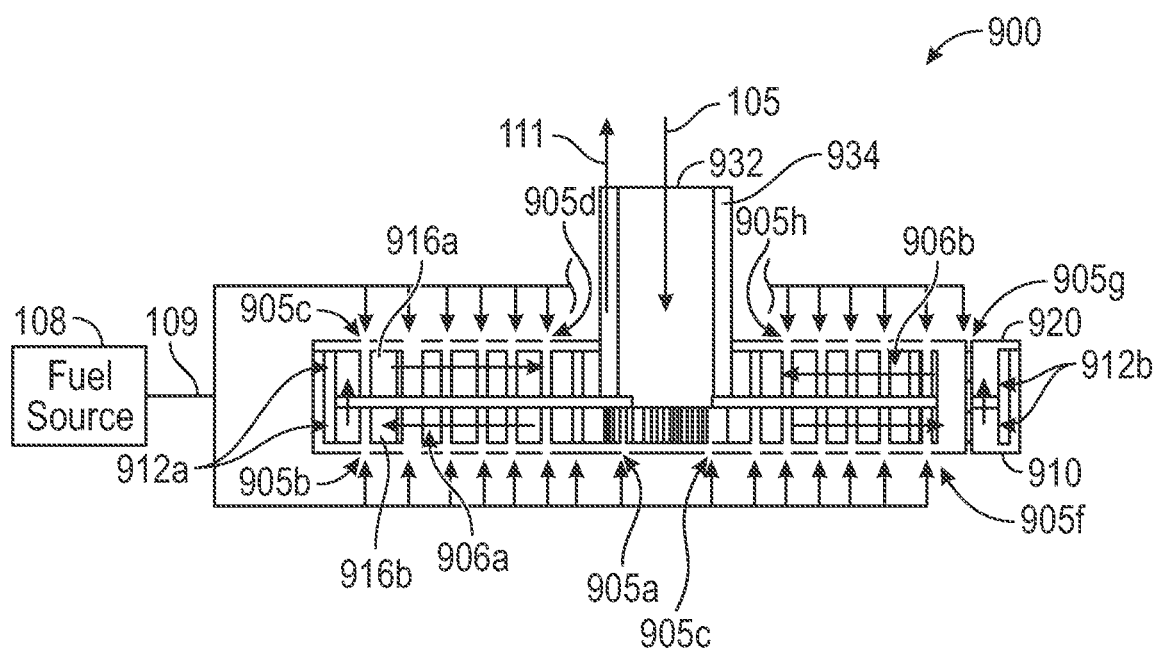

FIGS. 9A-9C are partially schematic representations of a combustion device or system 900 ("device 900"), in accordance with embodiments of the present technology. Specifically, FIG. 9A is an isometric view of the device 900, FIG. 9B is an exploded isometric view illustrating an upper plate portion and a lower plate portion of the device 900, and FIG. 9C is a cross-sectional view of the device 900 taken along the line 9C-9C of FIG. 9A. The device 900 can generally correspond to any one of the systems 100, 200, 300, 400, 600 described herein and can include one or more of the features described with respect to the systems 100, 200, 300, 400, 600. For example, the device 900 can include and/or be operably coupled to the controller 120 described with respect to FIG. 1.

Referring to FIGS. 9A and 9B together, the device 900 includes a lower or first portion 910 ("first portion 910"), an upper or second portion 920 ("second portion 920") coupleable to the lower portion 910, and a fluid exchange or third portion 930 ("third portion 930") coupled to the second portion 920. The third portion 930 includes a first channel or annulus 932 ("first channel 932") (FIGS. 9B/9C) configured to receive the preheated air 105 traveling in a first direction toward the second portion 920, and a second channel 934 (FIGS. 9B/9C) peripheral to (e.g., radially outward of) the first channel 932 and configured to receive the exhaust gas 111 traveling in a second direction away from the second portion 920. The first and second portions 910/920 can each include outer surfaces that are configured to be in contact with and/or thermally coupled to a heat module (e.g., the heat module(s) 110 or 410) for heat transfer from the device 900 to the heat module. As shown in FIG. 9B, the first portion 910 can include a recessed area 914 including a plurality of fins, including fins 916a/b/c/d (collectively referred to as "fins 916"). The fins 916 can be similar to the fins 812 (FIGS. 8A-8C) and have the same functionality previously described.

Referring next to FIG. 9C, which is a cross-sectional view of the device 900 when the first portion 910 is coupled to the second portion 920, the device 900 can further include a plurality of openings or fuel inputs 905a/b/c/d/e/f/g/h (collectively referred to as "openings 905") configured to receive the fuel 109 from a fuel source 108, and combustion channels 912a/b ("collectively referred to as combustion channels 912"). The openings 905 can be similar to the openings 805 (FIGS. 8A-8C) and have the same functionality previously described. The combustion channels 912 are configured to receive the preheated air 105 via the third portion 930 and combust the preheated air 105 with the fuel 109 injected via the openings 905 at various points along combustion channels 912. As such, the combustion channels 912 can include combustion zones 906a/b (collectively referred to as "combustion zones 906"). In operation, the preheated air 105 is directed via the first channel 932 toward the first portion 910 and the combustion channels 912, where the preheated air 105 reacts with the fuel 109 to form exhaust gases. Exhaust gases from each combustion zone are directed, along with unreacted oxidants from the preheated air 105, to downstream combustion zones. As the exhaust gases travel through the combustion channels 912, heat is transferred from the exhaust gases and combustion within the combustion channels 912 to fins 912 of the first portion 910. The exhaust gas 111 from the last combustion zone of the combustion channels 912 is directed away from the first portion 910 via the second channel 934. Within the second channel 934, the exhaust gas 111 can exchange heat with the incoming preheated air 105 to transfer heat from the exhaust gas 111 to the preheated air 105. In some embodiments, the third portion 930, and/or the first and second channels 932/934, can comprise an air preheat module (e.g., the air preheat module 104), as described elsewhere herein. Additionally or alternatively, in some embodiments the exhaust gas 111 is directed from the second channel 934 to an air preheated module.

III. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing temperatures, pressures, heat fluxes, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered examples (1, 2, 3, etc.) for convenience. These are provided as examples and do not limit the present technology. It is noted that any of the dependent examples may be combined in any combination, and placed into a respective independent examples. The other examples can be presented in a similar manner.

1. A combustion system, comprising:
a first combustion zone configured to (i) combust preheated air and a first fuel received via a first fuel input and (ii) generate a first exhaust gas, wherein the first exhaust gas comprises a first excess air, and wherein the preheated air has a temperature above an auto-ignition temperature when mixed with the fuel;
a second combustion zone downstream of the first combustion zone, wherein the second combustion zone is configured to (i) combust the first exhaust gas and a second fuel received via a second fuel input and (ii) generate a second exhaust gas having a second excess air less than the first excess air; and
a heat module thermally coupled to the first combustion zone and/or the second combustion zone such that at least a portion of heat from the first combustion zone and/or second combustion zone is absorbed via the heat module.

2. The combustion system of any one of the examples herein, wherein the heat module is a first heat module thermally coupled to the first combustion zone such that the first heat module is configured to absorb heat from the combustion of the preheated air and the first fuel, the combustion system further comprising a second heat module thermally coupled to the second combustion zone such that the second heat module is configured to absorb heat from the combustion of the first exhaust gas and the second fuel.

3. The combustion system of any one of the examples herein, further comprising a fuel manifold fluidly coupled to a fuel source, the first combustion zone, and the second combustion zone, wherein the fuel manifold directs fuel from the fuel source to the first combustion zone via the first fuel input and to the second combustion zone via the second fuel input.

4. The combustion system of any one of the examples herein, wherein the first fuel input is configured to provide the fuel at a first flow rate and the second fuel input is configured to provide the fuel at a second flow rate different than the first flow rate.

5. The combustion system of example 4, wherein the first flow rate of the first fuel is greater than the second flow rate of the second fuel, and wherein the first flow rate is based on an expected heat release removed from the first combustion zone via the heat module.

6. The combustion system of any one of the examples herein, further comprising an air preheat module configured to preheat air, via heat from the second exhaust gas, to produce the preheated air.

7. The combustion system of any one of the examples herein, wherein a flow rate of the preheated air received by the first combustion zone is based on a carbon monoxide concentration of the second exhaust gas.

8. The combustion system of any one of the examples herein, wherein a temperature of the first fuel and/or a temperature of the second fuel is less than 50° C.

9. The combustion system of any one of the examples herein, wherein, in operation, the first exhaust gas has a first temperature and the second exhaust gas has a second temperature within 30° C. of the first temperature.

10. The combustion system of any one of the examples herein, further comprising a third combustion zone downstream of the second combustion zone, wherein the third combustion zone is configured to (i) combust the second exhaust gas and a third fuel and (ii) generate a third exhaust gas having a third excess air less than the second excess air.

11. The combustion system of any one of the examples herein, wherein the first combustion zone includes a first housing and the second combustion zone includes a second housing spaced apart from the first housing.

12. The combustion system of any one of the examples herein, further comprising a combustion channel housing the first combustion zone and the second combustion zone, wherein the first fuel input feeds the combustion channel at a first area and the second fuel input feeds the combustion channel at a second area downstream of the first area.

13. The combustion system of any one of the examples herein, wherein the first combustion zone has a housing, the combustion system further comprising a heat exchanger proximate and downstream of the first combustion zone, wherein the heat exchanger is within the housing.

14. The combustion system of any one of the examples herein, wherein the heat module comprises a heat-to-electricity converter or a thermionic energy converter.

15. A device for supporting combustion of fuel and preheated air, the device comprising:
a combustion channel including a channel housing, wherein the combustion channel is configured to receive preheated air above an auto-ignition temperature when mixed with fuel, and wherein, in operation, the combustion channel supports combustion within the channel housing;
a fuel chamber including a chamber housing and configured to receive fuel, wherein the fuel chamber is fluidly coupled to the combustion channel at fuel input portions spaced apart from one another along a dimension of the fuel chamber, wherein, in operation, the fuel flows from the fuel chamber to the combustion channel via the fuel input portions; and
a heat module thermally coupled to the combustion channel, wherein the heat module is configured to extract heat from the combustion within the channel housing.

16. The device of any one of the examples herein, wherein the combustion channel includes multiple combustion zones along the dimension of the combustion channel, and wherein individual combustion zones correspond to individual fuel input portions.

17. The device of any one of the examples herein, wherein:
the combustion zones include a first combustion zone, and a second combustion zone downstream of the first combustion zone,
the fuel input portions include a first fuel input portion, and a second fuel input portion spaced apart from the first fuel input portion,
the first combustion zone is configured to (i) receive the preheated air and receive the fuel via the first fuel input portion and (ii) generate a first exhaust gas having a first oxygen concentration, and
the second combustion zone is configured to (i) receive the first exhaust gas and receive the fuel via the second fuel input portion and (ii) generate a second exhaust gas having a second oxygen concentration less than the first oxygen concentration.

18. The device of example 17, wherein the second combustion zone does not receive a source of oxidant other than from the first exhaust gas.

19. The device of any one of the examples herein, wherein the combustion channel is peripheral to the fuel chamber.

20. A method for operating a combustion system, the method comprising:
   directing a first amount of fuel and preheated air to a first combustion zone, wherein the first combustion zone generates a first exhaust gas having a first excess air;
   directing the first exhaust gas and a second amount of fuel to a second combustion zone downstream of the first combustion zone, wherein the second combustion zone generates a second exhaust gas having a second excess air less than the first excess air; and
   extracting, via a heat module, heat from the first combustion zone and/or the second combustion zone.

21. The method of any one of the examples herein, wherein directing the first amount of fuel comprises directing the first amount of fuel from a fuel source to the first combustion zone at a first flow rate, and wherein directing the second amount of fuel comprises directing the second amount of fuel from the fuel source to the second combustion zone at a second flow rate less than the first flow rate.

22. The method of any one of the examples herein, further comprising preheating air via a preheat module to produce the preheated air, wherein preheating the air comprises heating the air using heat from the second exhaust gas.

23. The method of any one of the examples herein, wherein directing the first amount of fuel and the preheated air to the first combustion zone comprises (i) directing the first amount of fuel from a fuel chamber to a combustion channel including the first combustion zone and (ii) directing the preheated air to the combustion channel, wherein the combustion channel is radially outward of the fuel chamber.

24. The method of any one of the examples herein, wherein the fuel chamber is an elongate fuel chamber including a plurality of fuel inputs spaced apart from one another along a length of the elongate fuel chamber, the fuel inputs including a first fuel input configured to provide the first amount of fuel to the first combustion zone and the second fuel input configured to provide the second amount of fuel to the second combustion zone.

25. The method of any one of the examples herein, wherein the heat module comprises a thermionic converter, and wherein extracting the heat from the first combustion zone and/or the second combustion zone comprises generating, via the heat extracted from the first combustion zone and/or the second combustion zone, an electrical output from the thermionic converter.

We claim:

1. A combustion system, comprising:
   a first combustion zone configured to (i) combust preheated air and a first fuel received via a first fuel input and (ii) generate a first exhaust gas, wherein the first exhaust gas comprises a first excess air, and wherein the preheated air has a temperature above an auto-ignition temperature when mixed with the fuel;
   a second combustion zone downstream of the first combustion zone, wherein the second combustion zone is configured to (i) combust the first exhaust gas and a second fuel received via a second fuel input and (ii) generate a second exhaust gas having a second excess air less than the first excess air; and
   a heat module thermally coupled to the first combustion zone and/or the second combustion zone such that at least a portion of heat from the first combustion zone and/or second combustion zone is absorbed via the heat module.

2. The combustion system of claim 1, wherein the heat module is a first heat module thermally coupled to the first combustion zone such that the first heat module is configured to absorb heat from the combustion of the preheated air and the first fuel, the combustion system further comprising a second heat module thermally coupled to the second combustion zone such that the second heat module is configured to absorb heat from the combustion of the first exhaust gas and the second fuel.

3. The combustion system of claim 1, further comprising a fuel manifold fluidly coupled to a fuel source, the first combustion zone, and the second combustion zone, wherein the fuel manifold directs fuel from the fuel source to the first combustion zone via the first fuel input and to the second combustion zone via the second fuel input.

4. The combustion system of claim 1, wherein the first fuel input is configured to provide the fuel at a first flow rate and the second fuel input is configured to provide the fuel at a second flow rate different than the first flow rate.

5. The combustion system of claim 4, wherein the first flow rate of the first fuel is greater than the second flow rate of the second fuel, and wherein the first flow rate is based on an expected heat release removed from the first combustion zone via the heat module.

6. The combustion system of claim 1, further comprising an air preheat module configured to preheat air, via heat from the second exhaust gas, to produce the preheated air.

7. The combustion system of claim 1, wherein a flow rate of the preheated air received by the first combustion zone is based on a carbon monoxide concentration of the second exhaust gas.

8. The combustion system of claim 1, wherein a temperature of the first fuel and/or a temperature of the second fuel is less than 50° C.

9. The combustion system of claim 1, wherein, in operation, the first exhaust gas has a first temperature and the second exhaust gas has a second temperature within 30° C. of the first temperature.

10. The combustion system of claim 1, further comprising a third combustion zone downstream of the second combustion zone, wherein the third combustion zone is configured to (i) combust the second exhaust gas and a third fuel and (ii) generate a third exhaust gas having a third excess air less than the second excess air.

11. The combustion system of claim 1, wherein the first combustion zone includes a first housing and the second combustion zone includes a second housing spaced apart from the first housing.

12. The combustion system of claim 1, further comprising a combustion channel housing the first combustion zone and the second combustion zone, wherein the first fuel input feeds the combustion channel at a first area and the second fuel input feeds the combustion channel at a second area downstream of the first area.

13. The combustion system of claim 1, wherein the first combustion zone has a housing, the combustion system further comprising a heat exchanger proximate and downstream of the first combustion zone, wherein the heat exchanger is within the housing.

14. The combustion system of claim 1, wherein the heat module comprises a heat-to-electricity converter or a thermionic energy converter.

15. A device for supporting combustion of fuel and preheated air, the device comprising:
- a combustion channel including a channel housing, wherein the combustion channel is configured to receive preheated air above an auto-ignition temperature when mixed with fuel, and wherein, in operation, the combustion channel supports combustion within the channel housing;
- a fuel chamber including a chamber housing and configured to receive fuel, wherein the fuel chamber is fluidly coupled to the combustion channel at fuel input portions spaced apart from one another along a dimension of the fuel chamber, wherein, in operation, the fuel flows from the fuel chamber to the combustion channel via the fuel input portions; and
- a heat module thermally coupled to the combustion channel, wherein the heat module is configured to extract heat from the combustion within the channel housing.

16. The device of claim 15, wherein the combustion channel includes multiple combustion zones along the dimension of the combustion channel, and wherein individual combustion zones correspond to individual fuel input portions.

17. The device of claim 16, wherein:
- the combustion zones include a first combustion zone, and a second combustion zone downstream of the first combustion zone,
- the fuel input portions include a first fuel input portion, and a second fuel input portion spaced apart from the first fuel input portion,
- the first combustion zone is configured to (i) receive the preheated air and receive the fuel via the first fuel input portion and (ii) generate a first exhaust gas having a first oxygen concentration, and
- the second combustion zone is configured to (i) receive the first exhaust gas and receive the fuel via the second fuel input portion and (ii) generate a second exhaust gas having a second oxygen concentration less than the first oxygen concentration.

18. The device of claim 17, wherein the second combustion zone does not receive a source of oxidant other than from the first exhaust gas.

19. The device of claim 15, wherein the combustion channel is peripheral to the fuel chamber.

20. A method for operating a combustion system, the method comprising:
- directing a first amount of fuel and preheated air to a first combustion zone, wherein the first combustion zone generates a first exhaust gas having a first excess air;
- directing the first exhaust gas and a second amount of fuel to a second combustion zone downstream of the first combustion zone, wherein the second combustion zone generates a second exhaust gas having a second excess air less than the first excess air; and
- extracting, via a heat module, heat from the first combustion zone and/or the second combustion zone.

21. The method of claim 20, wherein directing the first amount of fuel comprises directing the first amount of fuel from a fuel source to the first combustion zone at a first flow rate, and wherein directing the second amount of fuel comprises directing the second amount of fuel from the fuel source to the second combustion zone at a second flow rate less than the first flow rate.

22. The method of claim 20, further comprising preheating air via a preheat module to produce the preheated air, wherein preheating the air comprises heating the air using heat from the second exhaust gas.

23. The method of claim 20, wherein directing the first amount of fuel and the preheated air to the first combustion zone comprises (i) directing the first amount of fuel from a fuel chamber to a combustion channel including the first combustion zone and (ii) directing the preheated air to the combustion channel, wherein the combustion channel is radially outward of the fuel chamber.

24. The method of claim 20, wherein the fuel chamber is an elongate fuel chamber including a plurality of fuel inputs spaced apart from one another along a length of the elongate fuel chamber, the fuel inputs including a first fuel input configured to provide the first amount of fuel to the first combustion zone and the second fuel input configured to provide the second amount of fuel to the second combustion zone.

25. The method of claim 20, wherein the heat module comprises a thermionic converter, and wherein extracting the heat from the first combustion zone and/or the second combustion zone comprises generating, via the heat extracted from the first combustion zone and/or the second combustion zone, an electrical output from the thermionic converter.

* * * * *